March 3, 1964 R. L. KERR 3,123,247
VALVE POT COVER
Filed Dec. 13, 1961
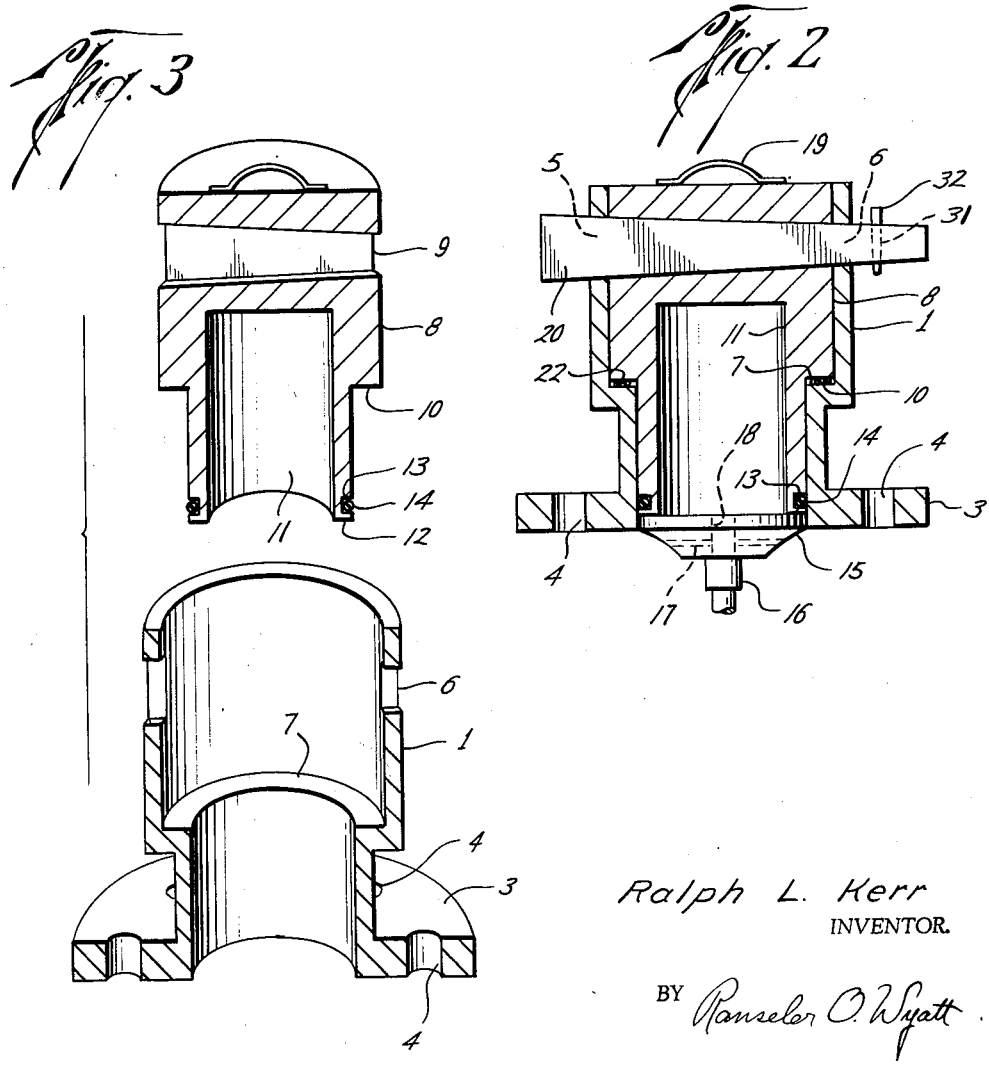
Ralph L. Kerr
INVENTOR.
BY Ranseler O. Wyatt
ATTORNEY

United States Patent Office 3,123,247
Patented Mar. 3, 1964

3,123,247
VALVE POT COVER
Ralph L. Kerr, 6120 Lake, Houston, Tex.
Filed Dec. 13, 1961, Ser. No. 159,486
5 Claims. (Cl. 220—46)

This invention relates to new and useful improvements in a valve pot cover.

It is an object of this invention to provide a valve pot cover for slush pump valves, and the like, having novel means for releasably anchoring the inner member of the cover in position.

It is another object of the invention to provide a valve pot cover for slush pump valves, and the like, having novel means for sealing the inner member in the outer member when in covering position.

It is another object of the invention to provide a valve pot cover of novel construction providing a light weight quick change cover for valve pots that may be quickly and easily removed for valve inspection and service.

With the above and other objects in view, the invention has relation to certain novel features of construction and arrangement of parts more particularly defined in the following specification and illustrated in the accompanying drawings, wherein:

FIGURE 1 is a side elevational view of a slush pump, in dotted lines, showing the invention mounted on a pair of valve pots.

FIGURE 2 is a side elevational view, in cross section, of the valve pot cover installed on a pump housing.

FIGURE 3 is a side elevational view, in cross section, of the inside member of the valve pot cover, and the outside member of the valve pot cover, in exploded relation.

Referring now more particularly to the drawing, the numeral 1 designates the outside member of the valve pot cover to be mounted on a slush pump housing 2, over a valve pot (not shown) and which is flanged as 3 on the lower margin, said flanged area having ports as 4, 4 through which suitable bolts are inserted for mounting on the slush pump housing.

Aligned rectangular ports 5, 6 are formed in the side walls of the member 1, the port 5 being of greater length than the port 6, and the member being mounted on the pump housing 2 so that the ports 5, 6 are parallel with the flow line (not shown) of the pump. The member 1 is cylindrical and is reduced in diameter adjacent the flanged end forming the internal shoulder 7.

The inside member 8 has a tapered rectangular transverse port 9 in the upper portion thereof, and a cylindrical outer wall, the outside diameter thereof being reduced adjacent one end forming the shoulder 10. The upper portion of the member 8 is solid and the lower portion hollow, a bore 11 being formed longitudinally in the inside member 8, extending from the bottom 12 thereof to a point adjacent the port 9. A groove 13 is formed circumferentially on the outer surface of the member 8 adjacent the bottom 12. A suitable flexible packing, as the O-ring 14, is mounted in the groove 13, and extends therefrom to contact the inner wall of the member 1.

A valve top 15, to which the bottom 12 of the inside member extends when the inside member 8 is in position in the outside member 1, is provided with the usual valve guide 16, and bleeder ports 17 extend from the axial vertical bore 18 transversely through the valve top 15 to bleed the bore 11.

A handle, as 19, is mounted on the top of the inside member 8 and in parallel alignment with the port 9.

A tapered pin 20, to be received by the ports 5, 6 and 9, is provided with a vertical port 31 into which the locking pin 32 is mounted when the pin 20 is in locking position in the outside and inside members. A flexible packing, such as the O-ring 22, is seated on the shoulder 7 and is contacted by the shoulder 10 of the member 8 when the member 9 is placed in the member 1, further sealing the members against leakage.

To place the member 8 in the member 1, a user grips the handle 19 to lift the insert inner member 8 and the member 8 is placed in the member 1, with the shoulder 10 bearing against and compressing the packing 22 against the shoulder 7, and the packing 14 bearing against the inside wall of the member 1. The port 9, being in parallel alignment with the flow way of the pump, the user may align the handle 19 with the flow way as the member 8 is moved into place, thus aligning the ports 5, 6, 9 and the pin 20 is then inserted, the tapered end passing first through the port 5, then the port 9 and then the port 6, and the member 8 thus moved tightly into position in the member 1, and the pin 32 then placed in the port 31, preventing the inadvertent removal of the pin 20.

To remove the member 8, the process is reversed, the pins 32, 20 being quickly and easily knocked out of locking position, and the inner member being substantially hollow, will be light, and easily lifted out of the outer member 1, and the valve in the valve pot inspected or serviced.

While the foregoing is considered a preferred form of the invention, it is by way of illustration only, the broad principle of the invention being defined by the appended claims.

What I claim is:

1. In a valve pot cover, a cylindrical inside member having a solid portion and a horizontal tapered port extending therethrough and a longitudinal bore in one end, the outer surface of said member being reduced in diameter adjacent one end forming therein an external shoulder, an external groove adjacent one end of said member and flexible packing in said groove, an outside member into which the inside member is mounted and ports in said outside member in alignment with said port in said inside member and a tapered pin mounted in said ports.

2. In a valve pot cover, a removable cylindrical inside member having a solid portion and a horizontal tapered port extending therethrough and a longitudinal bore in one end, the outer surface of said member being reduced in diameter adjacent one end forming therein an external shoulder, an external groove adjacent one end of said member and flexible packing in said groove, an outside member into which the inside member is mounted and ports in said outside member in alignment with said port in said inside member and a tapered pin mounted in said ports, a handle on the upper end of said inside member parallel in alignment with said tapered port.

3. In a valve pot cover, an outside member cylindrical in shape and circumferentially reduced adjacent one end forming an internal shoulder, a flexible packing on said shoulder, diametrically opposed rectangular ports in said member, one of said ports being of greater length than the other, an inside member mountable in said outside member, said inside member being circumferentially reduced adjacent one end forming a shoulder, an external groove adjacent the reduced end of said inside member and flexible packing in said groove, a horizontal tapered port through said inside member adjacent the other end thereof, said port being in alignment with said ports in said outside member when said inside member is in position in said outside member, a vertical bore in said inside member extending from said reduced end of said inside member to a point adjacent said tapered port, a tapered pin mountable through said ports in said inside and outside members and means for releasably maintaining said pin in position.

4. In a valve pot cover, a cylindrical inside member having its upper portion solid and being hollow beneath said solid portion, a tapered port extending transversely through said solid portion, an outer member into which said inside member is mounted, ports in said outer member in alignment with the respective ends of the tapered port in said inside member, a tapered pin extending through said ports and packing means between said inside and outside members.

5. In a valve pot cover, an outer member having a flange on the lower end and bolt receiving holes in said flange, an internal shoulder formed in said outer member and packing means on said shoulder, rectangular ports in diametric opposition in said outside member adjacent the upper end thereof, one of said ports being of greater length than the other, an inner member being circumferentially reduced forming a shoulder adapted to seat on the internal shoulder of said outer member, the upper portion of said inner member being solid and the lower portion of said inner member being hollow, a tapered port extending transversely through said solid portion of said inner member, a tapered pin extending through said ports in said outer member and through said tapered port through said inner member, a handle on said inner member in parallel alignment with said tapered port and packing means adjacent the lower end of said inner member.

References Cited in the file of this patent

UNITED STATES PATENTS

| | | |
|---|---|---|
| 28,221 | Warren | May 8, 1860 |
| 1,389,542 | Wereley | Aug. 30, 1921 |
| 2,588,313 | Weber et al. | Mar. 4, 1952 |
| 2,725,252 | Greer | Nov. 29, 1955 |

FOREIGN PATENTS

| | | |
|---|---|---|
| 84 | Great Britain | 1855 |
| 3,948 | Great Britain | 1885 |
| 7,741 | Great Britain | 1890 |
| 6,588 | Great Britain | 1913 |
| 66,147 | France | Jan. 30, 1956 |

(First addition to No. 1,102,894)